United States Patent [19]
Walters

[11] 4,084,786
[45] Apr. 18, 1978

[54] VALVES

[76] Inventor: Tom Walters, 2102 Mason Blvd., Point Pleasant, W. Va. 25550

[21] Appl. No.: 763,496

[22] Filed: Jan. 28, 1977

[51] Int. Cl.² .......................................... F16K 31/44
[52] U.S. Cl. .................................... 251/250; 251/336
[58] Field of Search ........................ 251/250, 336, 214

[56] References Cited
U.S. PATENT DOCUMENTS

| 401,588 | 4/1889 | Ray ..................................... 251/250 |
| 1,887,694 | 11/1932 | Masker ................................. 251/250 |

Primary Examiner—Edgar W. Geoghegan

[57] ABSTRACT

Cylindrical valve body with piping attachment ends housing a quick opening and closing rack and gear operated globe type valve, having radially positioned seating with axially guided valve member with a valve rack stem engaged to a gear having a guided shaft parallel to a radial plane and lever controlled outside of a retaining flange where the control lever hub is spline connected and controlled thereupon by a compression spring retained to the drive gear shaft by a bolting arrangement.

34 Claims, 8 Drawing Figures

VALVES

This invention relates in general to quick opening and closing valves as used in piping systems and more particularly to a new and useful valve assembly with improved operational and seating advantages.

Present ball, plug, gate and globe type valves upon seating closed either wedgingly chafe, rotatingly grind or squirm to seating and sealing position causing an inherent wear and crippling of the seating surfaces. Present gate and globe valves have internal "cavity voids" at their stem bonnet areas that collect contaminating residues. Present gate and globe valves have rising valve stems, reciprocating within the bonnet packing seal. The packing must be firmly compressed to sealingly contain internal pressures of the piping systems to the point that large valves require oversized hand wheels or geared mechanisms to open and close the valves. Quite often the leverage gained by such hand wheels and geared mechanisms becomes a disadvantage by distorting the valve stem during the effort to completely close the valve seating. After which the valve rarely can be totally closed again without repair. Damage to the valve stem is also compounded due to the stem being guided only at the bonnet end. None of the above valves have pressure sealing seating.

It is therefore, an important object of the present invention to provide a valve assembly embodying a simple rugged design for high and low temperature and pressure services, that is readily adaptable to hydraulic and pneumatic actuating cylinders for remotely controlled piping systems, that has precision aligned ellipsoidal seating that has the advantage of pressure seating and sealing and does not necessarily depend upon the mechanical purchase of the gear drive for seal and seating, that has the leverage advantage of rack and gear valve stem drive opening and closing straight axial movement. That has an internal valve body chamber free of bonnet and the like cavity voids, that has an outer friction brake cushioned operating lever control and selective valve throttling positioning quadrant plate at the rotatable radially positioned drive gear shaft and drive gear shaft retaining flange especially suitable for manual operation of the operating lever when the valve is desired to remain partially open as well as fully open. That has a valve stem guided each side of the seating area, that has a seating design wherein the mating parts are not required to wedgingly chafe, rotatingly grind or squirm to a seated position, a seating configuration that will not cause the valve to become stuck within the seat. That has ellipsoidal seating design configuration that protects the valve seating seal material sandwiched between the valve parts proper in a manner of seating that all peripheral mating surfaces of the valve upon contacting the valve seat automatically and evenly reseat with the closing operation as the seating surfaces wear providing a long life positive no-leak seating and sealing assurance that tightens with internal pressures being contained within the valve to where metallic valve parts contact the metallic body seating and the seal material is confined to function similar to an "o" ring seal. That has seal receiving configurations at seating, gear drive shafting and gear drive shaft retaining flange functionable with elastomer and graphited wrapping and layered seal materials for providing the widest range of valving services, and that has the lubrication feature for the gear drive shaft by the use of graphited and teflon seal materials.

In accordance with the preset invention, a cylindrical valve body part is provided with a radially positioned ellipsoidal seat configuration that receives the valve proper parts having a like mating configuration at seating where an axis oriented valve stem continues downstream of the seating area to be slidably received and guided by a boss secured to the valve body and said stem with rack type gear teeth continues upstream of the seating area to be slidably received and guided by a boss secured to the valve body. A drive gear shaft assembly positioned parallel to a radial plane is provided, where the gear engages the rack gear teeth and the drive shaft is received and supportedly aligned and lubricatingly sealed one end within an internal boss within the valve body and said shaft is shouldered along the opposite end to abut against the inner face of a retaining flange and said shaft to be received, supported and lubricatingly sealed therein with said flange secured to the valve body. The drive gear shaft protrudes outward and is provided with a spline engagement within an operating lever hub where the hub is controlled thereupon by a compression spring retained to the drive gear shaft by a bolting arrangement whereby said hub with raised spine configurations can be rotatingly aligned to be oriented by a corresponding grooved configuration upon a friction brake quadrant plate secured by the retaining flange bolting between said flange and said hub providing a position holding feature of the lever and valve for manual operation when the valving is desired to remain from positions of partially to fully open. The drive gear shaft is axially positioned by said shoulder abutting the inner face of said retaining flange and maintained abutted by said compression spring being restricted at its outer end by a bolting arrangement secured to said shaft end whereby the reaction force of said compressed spring with its inner end abutting the operating lever hub conveys said force inward to said retaining flange in a manner whereby the drive gear shaft is firmly positioned within the valve operating assembly.

These together with other objects and advantages which will become subsequently apparent reside in the details of construction and operation as more fully hereinafter described and claimed, reference being made to the accompanying drawings forming a part hereof, wherein like numerals refer to like parts throughout.

Figure 1:
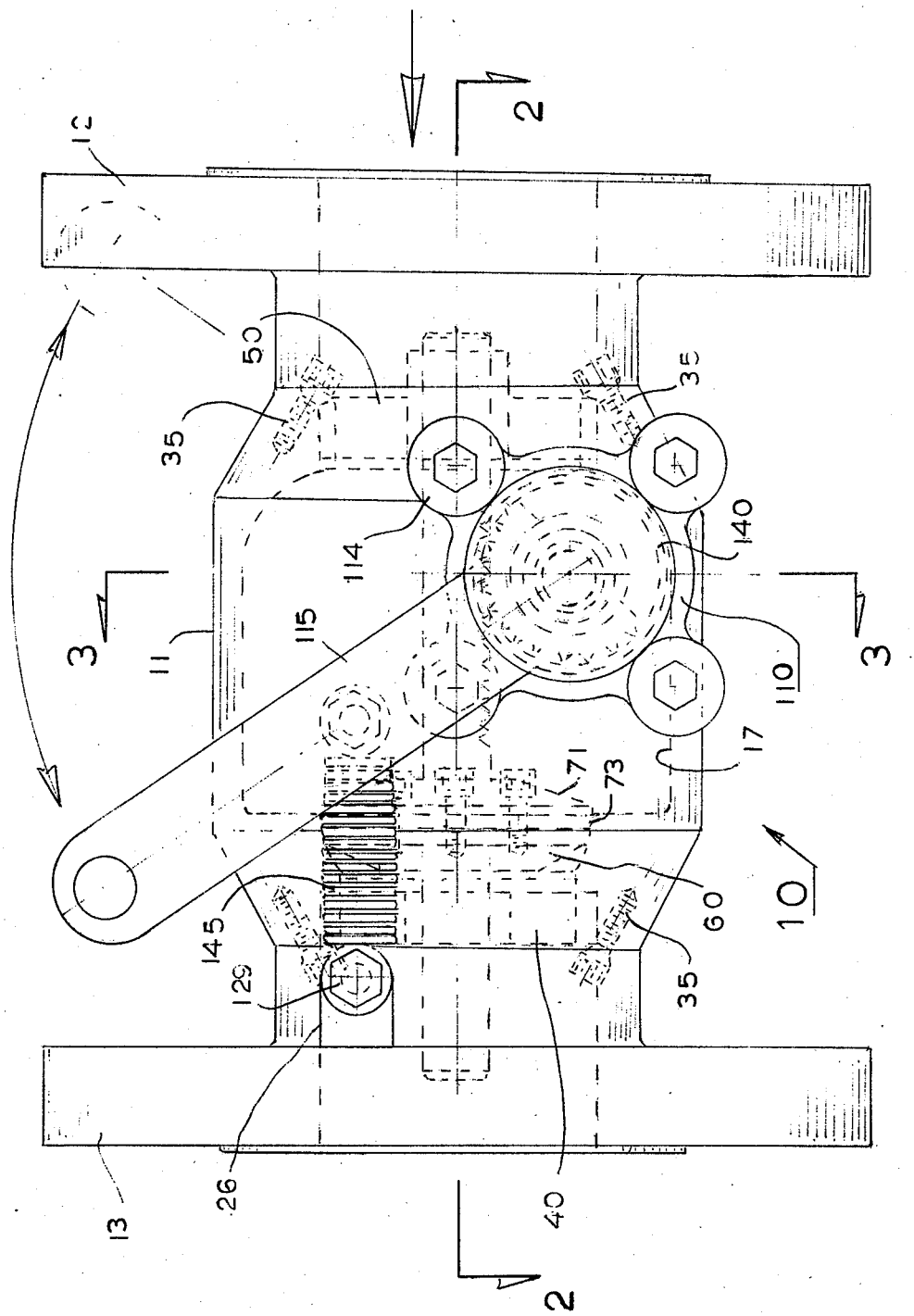
FIG. 1 is a side elevation view of the present invention.
Figure 2:
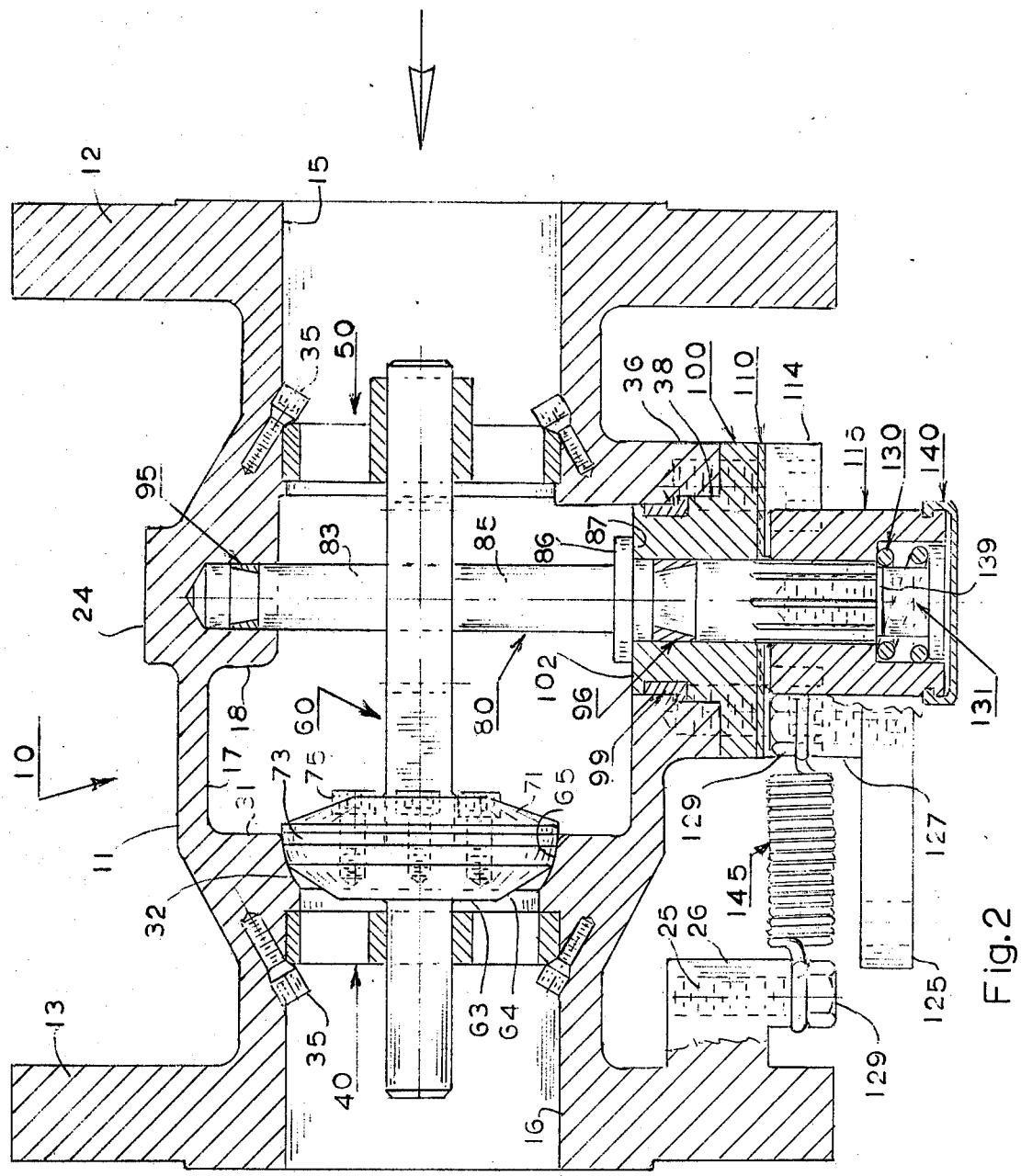
FIG. 2 is a plan view taken substantially through a plane indicated by section line 2 — 2 in FIG. 1.

Referring now to the drawings in detail, FIGS. 1, 2, 3, 6, 7 and 8 show a typical valve assembly 10 constructed in accordance with the present invention. Cylindrical valve body 11 with flange 12 at inlet bore 15, flange 13 at discharge bore 16 with flanges 12 and 13 having attachment bolting holes 14. Bore 16 receives guide boss member 40 as more clearly noted in FIG. 6 with surface 42 of 40 slidably received by bore 16 to where face 43 of 40 abuts shoulder 28 of body 11 and is secured thereto by screws 35 at threading 30 to where conical bevel 29 of screws 35 seat in a like bevelled countersunk configuration partly in body 11 and partly in ring 41 of 40 to position and maintain alignment of guide boss member 40 with respect to the valve axis. Valve member 60 as more clearly noted in FIG. 7 with cylindrical downstream part 62 beginning at face 61 and ending at shoulder 63 that leads outward on flow easement bevel 64 to ellipsoidal part 65 ending at face 66 that receives seal member 73 secured to face 66 by bolting 75 through retaining flange 71 at drills 74 of 71 and threading 67 at face 66, with peripheral surface 76 of 71 being part of the ellipsoidal configuration of the valve member, and with flange 71 cylindrical receiving shoulder 68 leading upstream to square shank section 69 ending at face 72 where the lower face of 69 is provided with rack type gear teeth 70. Member 60 is entered through bore 15 of body 11 as more clearly noted in FIG. 6 to where cylindrical surface 62 is slidably received by bore 44 of hub 45 supported by strut 46 of member 40 and ellipsoidal part 65 of 60 is received by ellipsoidal seat 32 having bore 27 at its downstream end and face 31 at its upstream end. Whereupon guide boss member 50 is slidably received within bore 15 of body 11 upon surface 53 of 50 to where face 52 of 50 abuts shoulder 34 at bore 33 of body 11 as shank 69 of 60 is slidably received by square opening 55 of hub 54 supported by struts 56 of member 50. Member 50 is secured to body 11 by screws 35 at threading 30 to where conical bevel 29 of screws 35 seat in a like bevelled countersunk configuration partly in body 11 and partly in ring 51 of 50 to position and maintain alignment of guide boss member 50 with respect to the valve axis. Seal 73 can be layers of teflon and graphites.

Figure 7:
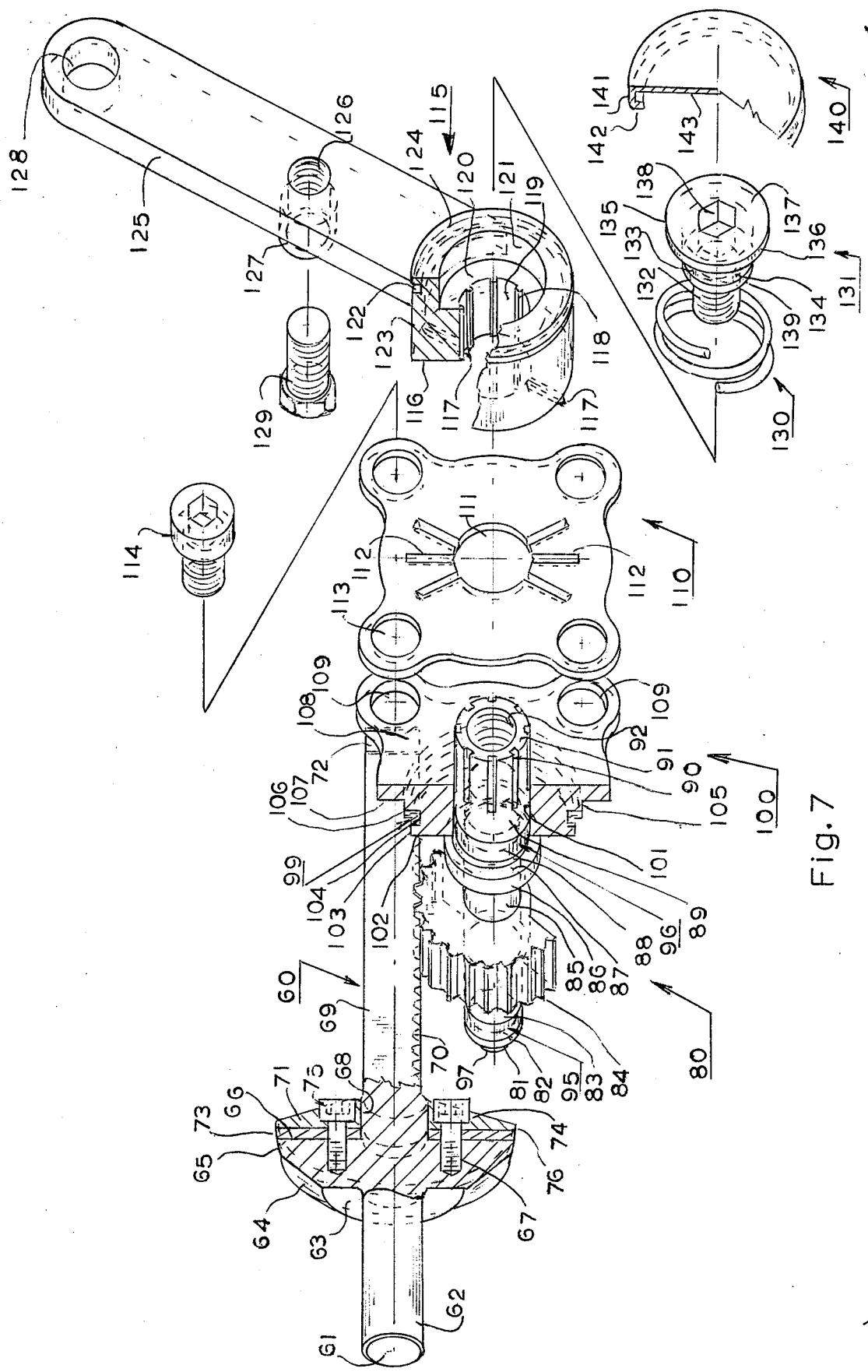
FIG. 7 is a sectional perspective view of the operating parts substantially disassembled.

Drive gear shaft 80 as more clearly noted in FIG. 7 has tail end 97 adjacent to bevel 81 leading to cylindrical shaft 83 which has tapered annular groove 82 that receives seal 95. Shaft section 83 has partial gear 84 affixed which leads to shaft 85 which has abutment flange 86 leading to cylindrical shaft section 89 which has tapered annular groove 88 that receives seal 96. Shaft section 89 has spline grooves 90 ending at face 91 where threads 92 are tapped in the end of the shaft section 89.

Figure 3:
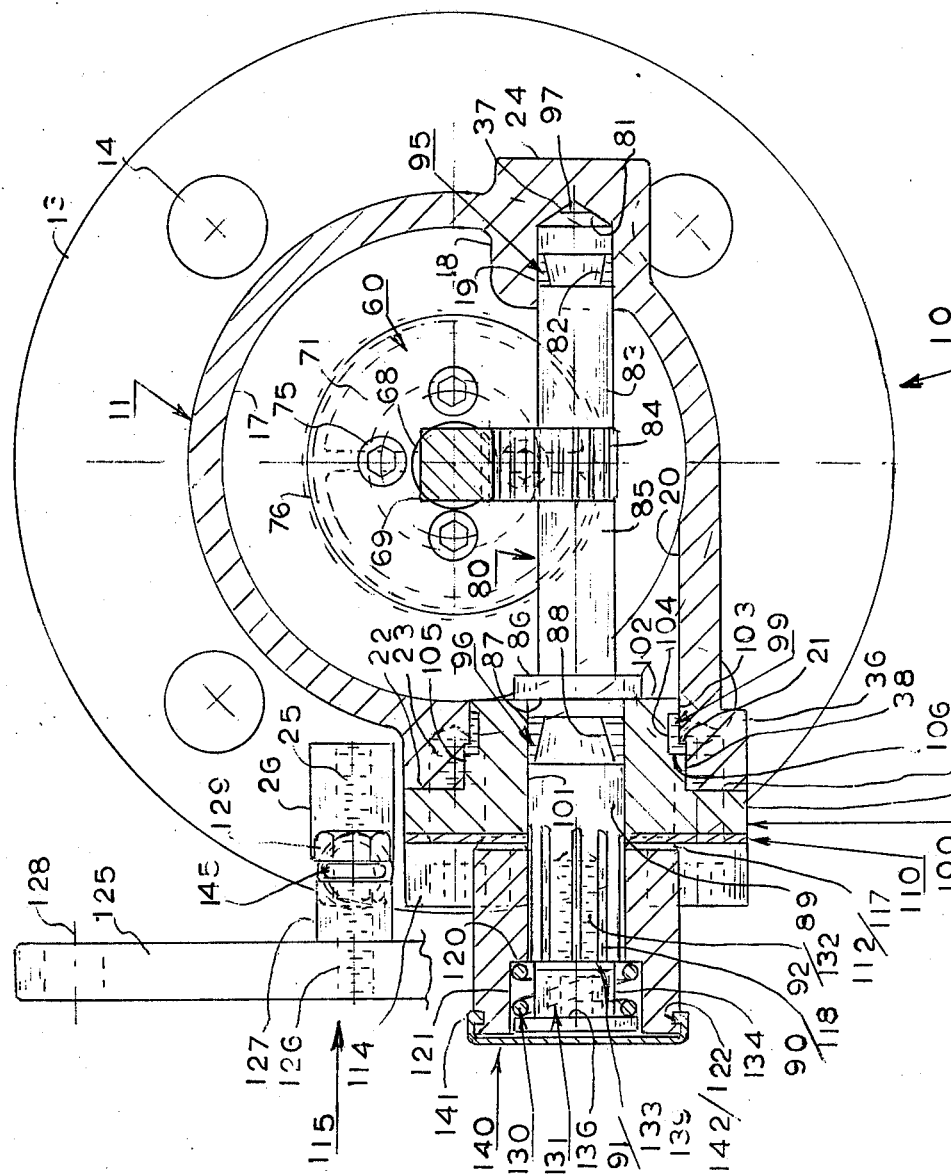
FIG. 3 is a sectional view taken substantially through a plane indicated by section line 3 — 3 in FIG. 1.

Drive gear shaft 80 as more clearly noted in FIG. 3 is entered through bore 20 of boss 36 of body 11 to where shaft section 83 of 80 is received in bore 19 of boss 18 on surface 17 of body 11 and to where seal 95 is received within bore 19 and conical bevel 81 of 80 contacts conical recess 37 adjacent to outer boss 24 of body 11, while gear 84 engages rack gear 70 of valve stem 69 of assembly 60. Whereupon retaining flange 100, with seal 99 positioned in annular groove 104 of surface 103 of 100, is positioned so bore 101 slides onto shaft section 89 over seal 96 of 80 and face 102 of 100 abuts face 87 of flange 86 of 80 and while cylindrical surface 103 and seal 99 of 100 are slidably received by bore 20 of boss 36 and cylindrical surface 105 of 100 is slidably received by bore 38 of boss 36 of body 11 as outward lip seal 99 is firmed between bore face 21 of 11 and lip face 106 of 100 while face 107 of flange 108 of 100 contacts face 22 of boss 36 of body 11. Seals 95, 96 may be teflon and graphited tape wraps.

Friction brake quadrant plate 110, as more clearly noted in FIG. 7 has bolting holes 113, position grooves 112 for receiving raised spines 117 at face 116 of lever hub 123, and has bore 111 for fitting plate 110, with grooves 112 oriented to the top and to the bottom, over shaft section 89 of 80 to where said plate abuts face 108 of flange 100 whereupon bolts 114 are entered in holes 113 of 110, 109 of 100 to engage threads 23 of boss 36 on body 11.

Operating lever assembly 115 has handle 125 having attachment hole 128, boss 127 with tapped threads 126 for spring return attachment, hub 123 having abutment face 116 with raised spines 117, raised splines 118 in cylindrical section 119, and abutment face 120 at bottom of recess bore 121 that slidably receives spring 130.

With respect to gear 84 of 80 and rack teeth 70 of 60 engagement, the positioning grooves 112 of 110 and spline grooves 90 of 80 are to advantageously receive said splines 118 of hub 123 of 115. Bolt 131 has spring 130, retaining flange 135, hexagon socket 138, cylindrical section 134, and threads 132 which are engaged into threads 92 of 80 to compress spring 130 between face 136 of flange 135 of 131 and shoulder 120 of hub 123 and 115 to where face 133 of section 134 and 131 firmly contacts face 91 of 80 and spacer rings 139 when used and raised splines 117 of hub 123 of 115 are firmly against friction brake plate 110 to the left of the top grooves 112 and to the right of the bottom grooves 112 when the valving is in the closed position in a manner that the valving is essentially free to close and tighten further if the valve is cutting off the flow of pressured liquids and gases from moving downstream. Splines 117 of 123 will be engaged into grooves 112 of 110 in the various partial to open valving positions in a manner that permits the operating lever 125 to be rotated overpowering the reaction force of spring 130 as the configurations of splines 117 and grooves 112 upon being engaged and disengaged cause lateral movement of hub 123 upon its splines 118 within spline grooves 90 of 80.

Weather cap 140 with inside bead 142 on cylindrical rim 141 snaps onto hub 123 of 115 where bead 142 is received by annular groove 122 of 123 and face 143 of 140 contacts face 124 of hub 123.

Figure 8:
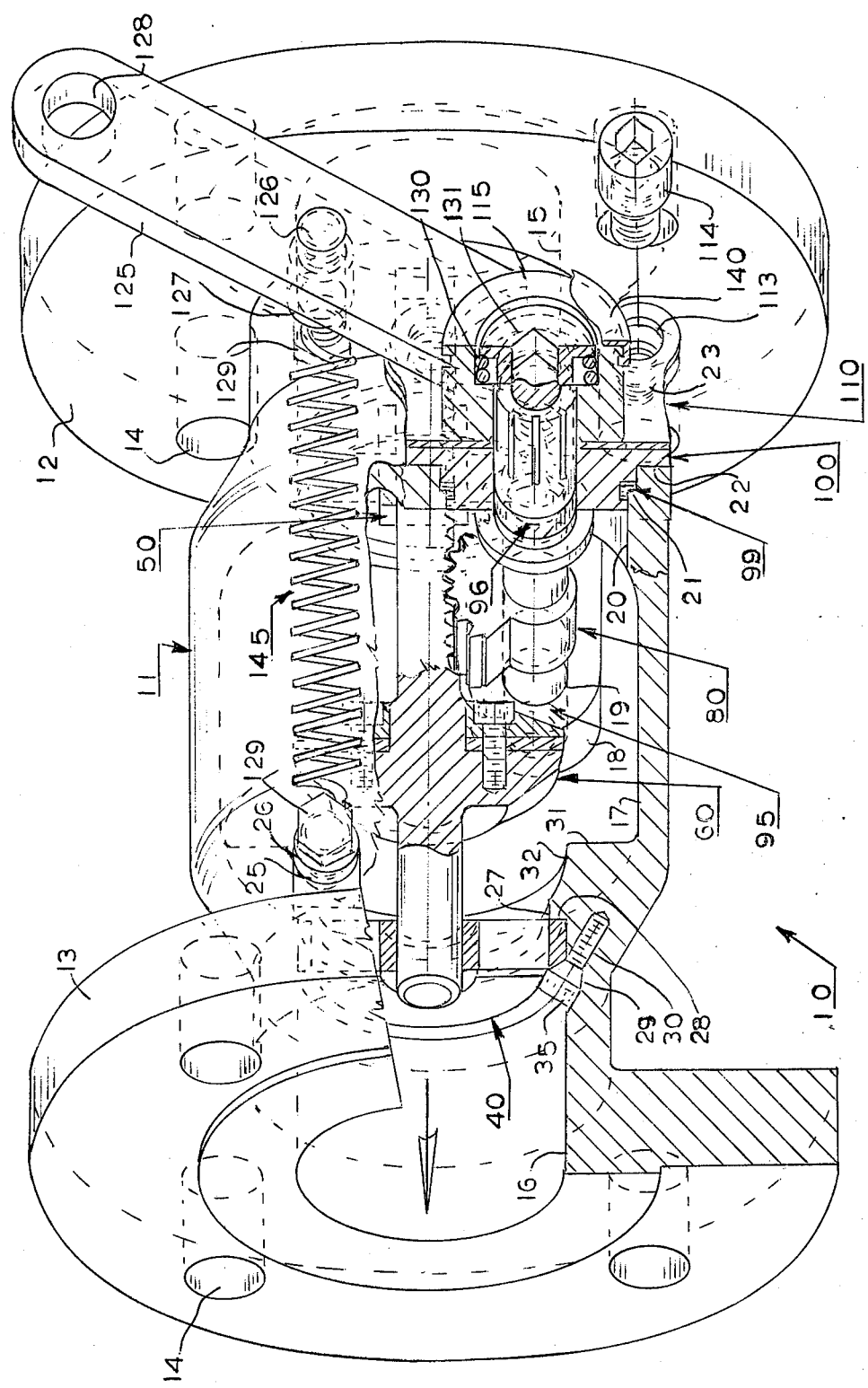
FIG. 8 is a sectional perspective view of the operating parts assembled in the valve body.

Extension spring 145 as more clearly noted in FIG. 8 is secured to boss 127 by bolt 129 at threads 126 of lever 125 of 115 on one end and by bolt 129 to boss 26 at threads 25 of flange 13 of body 11 on the other end in a manner that the reaction force of spring 145 aids in closing the valving operation and retains the valving closed as will be desired in some services.

Figure 4:
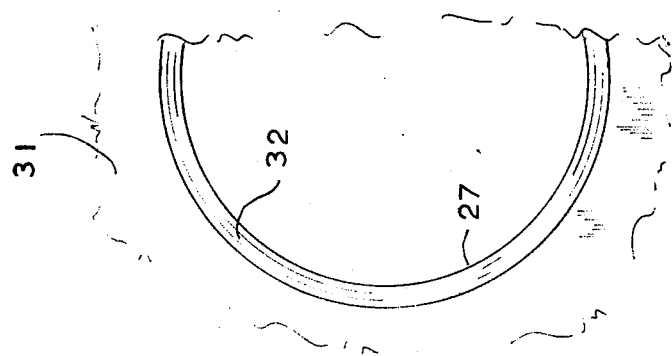
FIG. 4 is a partial elevation view of the valve seat taken substantially at the plane of the major axis of the ellipsoidal configuration.
Figure 5:
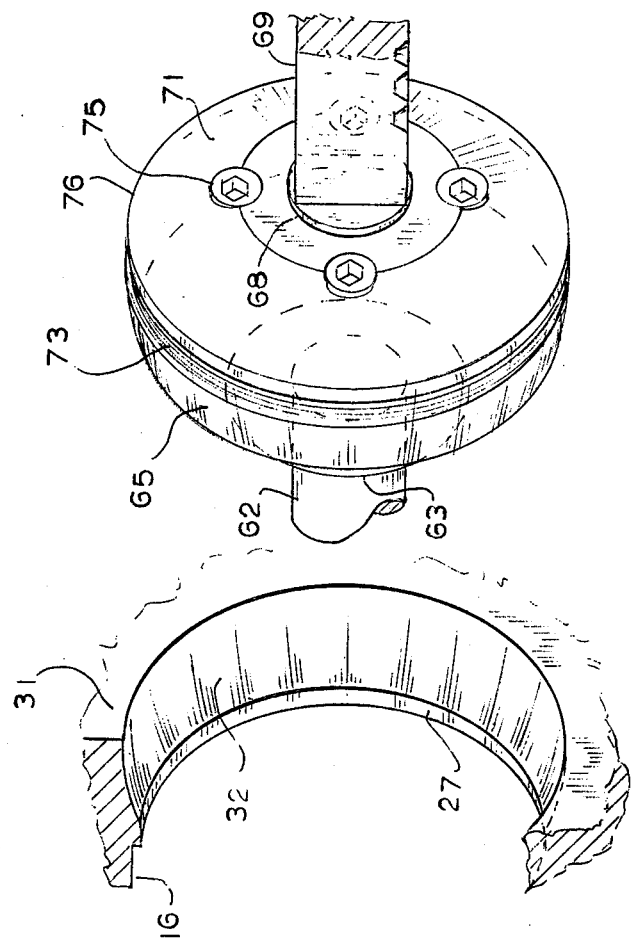
FIG. 5 is a partial perspective view of the valve seat and the valve member in an unseated position.
Figure 6:
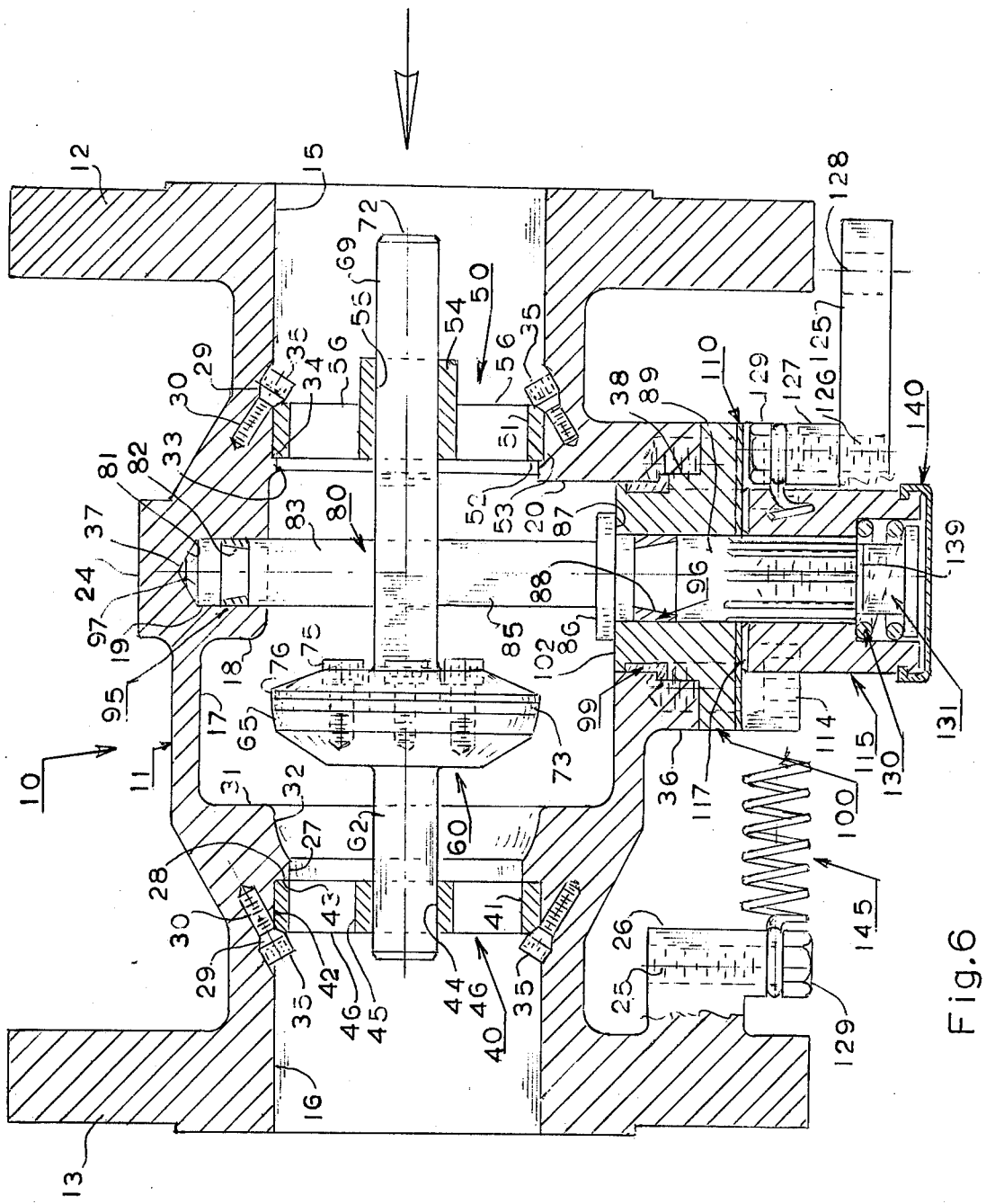
FIG. 6 is a plan view similar to FIG. 2 except valving members are shown in the opened positions.

FIGS. 4 and 5 show the portions of ellipsoidal configurations made use of for the desired curvatures of the seating components of the valve assembly wherein cutting plane sections parallel to the plane of the major axis are circular while cutting plane sections through the minor axis are elliptical providing practical ellipsoidal seating configurations wherein curvatures regress inwardly downstream from the mouth of the seat diminishing toward the throat of the seat forming a desired portion of an ellipsoidal socket as designated by numeral 32 of body 11 whereupon, with the mating valve member surfaces having a desired portion of an ellipsoidal solid as designated by the numerals 65, 73 and 76 of assembly 60, at the seating of the valve member within the seat the elliptical contours of said socket provide a precision centering guidance of said valve member while the corresponding circular mating contours of said socket and said valve member essentially provide the seating seal in a manner of protecting the valve member seal material 73 by surface 65 bearing the brunt of seating contact forces while also providing a seal along with seal material 73 within said socket configurations wherein said seal 73 will function similar to an "o" ring seal as a pressure seal component, where the mating of the valve member within said socket is wedge bind free, wherein the seating contact mating components will be guided to seat evenly balanced and automatically reseat as said components eventually wear providing a feature not associated with present valve designs.

The straight thrust seating action is made practical by the use of ellipsoidal seating as provided herein that eliminates, chafing, wedge binding and torque compressions prevalent in present gate and/or globe valve designs, that eliminates the necessity of severely binding the valving members' non port surfaces within the valve body to prevent leakage between same which necessity causes the inherent squirming, wearing and often crippling actions prevalent in present quick opening and closing ball and plug valve designs. While ellipsoidal seating curvatures have been used for a definition of the manner of seating herein, spheroidal and spherical seating curvatures used in a like manner will function in a likeness to the manners defined.

The foregoing is considered as illustrative only of the principle of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as set forth in the claims.

What is claimed as new is as follows:

1. A valve assembly for controlling the flow of liquids and gases comprising an ellipsoidal configuration valve member receiving seat within a valve body shell radially positioned relative to the axis of the valve body, a guided and axially movable valve and stem assembly that has members to provide a seat mating ellipsoidal configuration at valve seating surfaces whereupon straight axial movement is provided for said valve and stem assembly at ellipsoidal valve seating wherein seal material is confined between flange parts of said valve members at a seating area in a manner providing positioning and protection of said seal material, with the valve stem's cylindrical section extending downstream from the valve seating area where it is axially slidably received and guided within a boss supported by the valve body and with said stem's square section having rack type teeth on one face extending upstream to be axially slidably received and guided within a boss supported by the valve body, a drive gear shaft assembly with lubricating seals at alignment and support member junctures with a valve body receiving boss bore and an opposed bore in a retaining flange that positions said shaft parallel to a radial plane providing an arrangement for the aligned engagement of a gear on said shaft with the rack teeth on said valve stem operatable for seating and unseating at the valving operation by the partial rotations of an outer lever provided with a splined hub in engagement upon said drive gear shaft whereupon said hub has lateral outward movement within the limits of a compression spring being compressed to solid height where said spring is contained at its outer end by a flanged shoulder bolt engaged to the outer end of said drive gear shaft applying a reacting force inwardly back through said hub and a quadrant plate to said retaining flange with said drive gear shaft provided with a shoulder that abuts the inner face of said retaining flange substantially limiting said shaft's outward lateral movement as the reacting force of said spring substantially maintains said gear shaft to its inner limits while permitting said outward lateral movement of said hub for the engagement and disengagement of splines on said hub with positioning grooves in said quadrant plate whereby operating lever and valve positioning is substantially maintained as desired with each positioning groove in said quadrant plate while said operating lever is provided with a leverage advantage that upon the applied rotation of said lever said spring compressingly deforms as splines of said hub become disengaged from the grooves of said quadrant plate as said hub is forced laterally outward permitting quick opening and closing valving actions.

2. In combination of claim 1 wherein said ellipsoidal seating includes the configuration to place the seal material at the sidewall of the seat to make use of internal pressures contained within an upstream section of the valve assembly to provide a pressure seating and sealing force upon an upstream area of the valve thus firming said seal material onto said sidewall of the seat.

3. In combination of claim 2 wherein said use of internal pressures contained within the upstream section of the valve assembly to provide a pressure seating and sealing force upon the upstream area of the valve at the valve closing section is accomplished in a manner eliminating the necessity of a severe mechanical purchase to provide a substantial seating and sealing of the valve member within the valve seat.

4. In combination of claim 1 wherein said ellipsodial valve seating includes portions of ellipsoidal curvatures formed by circular plane sections parallel to the plane of the major axis of the ellipsoidal configurations wherein the radii of the circular plane sections diminish toward the throat of the seat in a manner to prohibit wedge binding and like conditions of the mating parts at the seating action.

5. In combination of claim 1 wherein said ellipsoidal valve member and seat configurations include ellipsoidal curvatures indicated by elliptical sections of cutting planes through the minor axis to provide precision self alignment of the contact mating parts on said axial movement at the seating action.

6. In combination of claim 1 wherein said seal material is confined between flange parts of said valve member at the seating area in a manner providing positioning and protection of said seal material where said seal material includes a configuration at its radial perphery to function an as"o" ring and the like seal on the seating action.

7. In combination of claim 1 wherein said guided ellipsoidal seating includes the use of portions of ellipsoidal curvatures for valve member and seat configurations to automatically be seated upon substantially the same series of corresponding circular plane sections of said ellipsoidal curvatures and continually sealingly reseat at repeated seating actions as the contact mating parts wear.

8. In combination of claim 1 wherein said seal material is confined between flange parts of said valve member at the seating area in a manner providing positioning and protection of said seal material where a downstream flange part includes contact mating configuration with the valve seat to protect said seal material by bearing the brunt of said valve member's contact forces with the ellipsoidsal seat on seating actions.

9. In combination of claim 1 wherein said seal material is confined between flange parts of said valve member at the seating area whereby said confining parts include configurations that permit seal materials to be in layers sandwiched together between said confining parts of said valve member.

10. In combination of claim 1 wherein said seal material is confined between flange parts of said valve members at the seating area where a combination of a downstream flange part and said seal material each include contact seal configurations providing a double seal on ellipsoidal seating action.

11. In combination of claim 1 wherein said straight axial movement is provided for said valve and stem assembly on ellipsoidal valve seating whereupon contact mating seal surfaces include circular plane sections parallel to the major axis of the ellipsoidal configurations that upon said movement and seating provide a positive seat and seal in an evenly balanced mating non-crippling manner that eliminates the necessity of hardened insert type seating parts.

12. In combination of claim 1 wherein said valve and stem assembly is axially guided each side of the valve seat by valve stem receiving bosses supported by the valve body in a manner that includes stem alignment upon the minor axis of the ellipsoidal seating configurations whereby with appropriate adaptors at said boss location precision honing and seating of the valve member with the valve seat is readily obtainable.

13. In combination of claim 1 wherein said ellipsoidal seat within the body includes substantially cylindrical surface curvatures of ellipsoidal configuration at said seal material contact mating area to receive replacement seals without the necessity of further honing and seating said seat.

14. In combination of claim 9 wherein said seal material is confined in a manner that provides for the usage of relatively thin teflon and graphited sheets as seal materials for their elastomer effect at valve seating operations.

15. In combination of claim 1 wherein said ellipsoidal valve member and seat configurations include regressive ellipsoidal curvatures from seat mouth to seat throat formed as indicated by circular sections of cutting planes parallel to the major axis plane and elliptical sections of cutting planes through the minor axis to provide a socket seal seating of the valve member within the valve seat on the ellipsoidal seating action.

16. In combination of claim 1 wherein said gear engagement includes an arrangement to provide the valve and stem assembly with axial movements.

17. In combination of claim 1 wherein said gear engagement includes an arrangement for the use of spur type teeth for the rack and gear.

18. In combination of claim 1 wherein said gear engagement includes an arrangement for the use of helical type teeth for the rack and gear.

19. In combination of claim 1 wherein said drive gear arrangement includes a thrust leverage advantage of geared movement for opening and closing the valve.

20. In combination of claim 1 wherein said drive gear arrangement includes a geared engagement providing quick opening and closing valving action.

21. In combination of claim 1 wherein said gear shaft includes a configurative arrangement to receive a reduction gear in lieu of said hub for additional torque advantage for large valves.

22. In combination of claim 1 wherein said drive gear shaft's operational movements include limiting configurations providing shaft rotation only where the shaft is considered the valve operating stem to eliminate the necessity of a reciprocating stem for valving operations.

23. In combination of claim 1 wherein said gear arrangement includes movement actions readily adaptable for attaching pneumatic cylinders to said lever to provide the necessary rotations for the remote control of the valving actions.

24. In combination of claim 1 wherein said retaining flange includes a configuration for its inner face to be flush with the inside shell of the valve body providing said body with a smooth cavity free interior at the operating shaft.

25. In combination of claim 1 wherein said gear shaft includes configurations providing tapered annular grooved recesses to receive seal materials in tape form with an inherent lubricating quality such as teflon and graphited materials in a manner that said tapered configuration provides a wedging seal upon confinement in said receiving bores.

26. In combination of claim 25 wherein said tapered annular grooved recesses receive seal materials in a manner that said tapered configurations provide the seal material with the shape of a frustrum of a cone where the base of said frustrum is exposed to internal pressures being controlled by the valve assembly which compressingly forces said seal material outward to be further confined within a smaller area providing a pressure sealing aid at shafting supports.

27. In combination of claim 1 wherein said drive gear shaft includes an arrangement providing freedom and ease of gear drive action in a manner that an extension spring can be attached to said lever and valve body for the purpose of automatically closing the valving action.

28. In combination of claim 1 wherein said flanged shoulder bolt threaded into the drive gear shaft includes a configuration to make use of spacer rings between the shoulder of said bolt and the outer end of the drive gear shaft providing compression adjustment of the compression spring retained by said bolt.

29. In combination of claim 1 wherein said quadrant plate includes configurations permitting the use of materials for the plate to function as a friction brake cushion to said splines between said groove spacing providing smooth lever action valving operations.

30. In combination of claim 1 wherein said valve stem is axially slidably received and guided within bosses supported by the valve body wherein said body includes annular boss support ring receiving recesses with configurations thereon when said ring is positioned permitting angular drilling and tapping and countersinking in a manner that the tapping is in the valve body while the countersinking is partly in the valve body and partly into the outer corner of said ring to receive countersunk head cap screws to maintain said ring confined against axial and torque forces.

31. In combination of claim 14 wherein said usage of relatively thin teflon and graphited sheets as seal materials whereupon said provisions for the use of said teflon type materials at the critical seating and sealing area of the valve member conditions the valve assembly suitable for use in controlling corrosive liquids and gaseous materials.

32. In combination of claim 14 wherein said usage of relatively thin teflon and graphited sheets as seal materials whereupon said provisions for the use of said graphited type materials at the critical seating and sealing area of the valve member conditions the valve assembly suitable for use in controlling extreme high temperatured as well as extreme low temperatured liquids and gaseous materials.

33. In combination of claim 4 wherein said valve seat and valve member curvatures include the provisions for the use of portions of spherical curvatures for the configurations of the valve seat and valve member.

34. In combination of claim 4 wherein said valve seat and valve member curvatures include the provision for the use of portions of spheroidal curvatures for configurations of the valve seat and valve member.

* * * * *